DR. JACOB MAYER, OF CLEVELAND, OHIO.

*Letters Patent No. 86,172, dated January 26, 1869.*

IMPROVED TONIC BEVERAGE.

The Schedule referred to in these Letters Patent and making part of the same.

*To all whom it may concern:*

Be it known that I, Dr. JACOB MAYER, of Cleveland, in the county of Cuyahoga, and State of Ohio, have invented a certain new and improved Tonic Beverage, styled "Boonekamp of Maagbitter;" and I do hereby declare that the following is a full and complete description of the same.

This beverage possesses all the properties required to constitute a healthful corrective-agent, to give a lively tone and action to the stomach, contains no mineral substances, is very pleasant to the taste, and produces none of those after-effects of drowsiness so common to many of the tonic beverages.

It is admirably calculated to cure dyspepsia and all kindred ailments.

The following are the ingredients employed in compounding the said beverage:

Myrrh; gentian; agaricus; calamus; cardamom; *Artemisia vulgaris;* *Radix angelica;* crocus or *Pimpinella anisum;* galgant; rhubarb-root; extract licorice; *Moschus islandica;* oryza.

Take equal parts of myrrh, *Pimpinella anisum,* and oryza, and a greater quantity of extract licorice, and a minimum quantity, and dissolve in boiling water. Next take equal parts gentian, agaricus, calamus, cardamom, *Artemisia vulgaris, Radix angelica,* a greater quantity of galgant, and a minimum quantity of rhubarb, and extract them in a sufficient quantity of wine. Mix the two preparations together, without filtering, and also a minimum quantity of crocus, dissolved in cold water. Leave the whole to settle, and then strain, when it will be ready for use.

The proportional quantities of these ingredients may be varied to suit the taste.

What I claim as my improvement, and desire to secure by Letters Patent, is—

The hereinabove-described beverage, compounded substantially as shown, and for the purpose set forth.

DR. JACOB MAYER.

Witnesses:
GEO. W. TIBBITTS,
GEO. HESTER.